US010974200B2

(12) United States Patent
Nishi et al.

(10) Patent No.: US 10,974,200 B2
(45) Date of Patent: Apr. 13, 2021

(54) SPIRAL MEMBRANE ELEMENT

(71) Applicant: Nitto Denko Corporation, Ibaraki (JP)

(72) Inventors: Mieko Nishi, Ibaraki (JP); Yuha Okazaki, Ibaraki (JP); Masashi Echizen, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 113 days.

(21) Appl. No.: 16/063,981

(22) PCT Filed: Dec. 14, 2016

(86) PCT No.: PCT/JP2016/087205
§ 371 (c)(1),
(2) Date: Jun. 19, 2018

(87) PCT Pub. No.: WO2017/115653
PCT Pub. Date: Jul. 6, 2017

(65) Prior Publication Data
US 2019/0001274 A1   Jan. 3, 2019

(30) Foreign Application Priority Data

Dec. 28, 2015 (JP) .............................. JP2015-256511

(51) Int. Cl.
*B01D 63/10* (2006.01)
*C02F 1/44* (2006.01)
(Continued)

(52) U.S. Cl.
CPC ........... *B01D 63/103* (2013.01); *B01D 63/10* (2013.01); *B01D 69/10* (2013.01); *B01D 69/12* (2013.01);
(Continued)

(58) Field of Classification Search
CPC ...... B01D 63/103; B01D 63/10; B01D 69/12; B01D 69/10; B01D 2313/04;
(Continued)

(56) References Cited

U.S. PATENT DOCUMENTS 4,933,083 A * 6/1990 Jones, Jr. ............... B01D 69/12
                                                             210/490
6,036,739 A * 3/2000 New, Sr. ............... B01D 39/083
                                                             210/499
(Continued)

FOREIGN PATENT DOCUMENTS

JP    S62-057609    3/1987
JP    H09-0276671   10/1997
(Continued)

OTHER PUBLICATIONS

International Preliminary Report of Patentability with Written Opinion of the International Searching Authority, dated Jul. 3, 2018, in corresponding International Patent Application No. PCT/JP2016087205.
(Continued)

*Primary Examiner* — Liam Royce
(74) *Attorney, Agent, or Firm* — Knobbe Martens Olson & Bear, LLP

(57) ABSTRACT

The object of the present invention is to provide a spiral membrane element that can make a composite semipermeable membrane high in effective membrane area, and that can restrain the composite semipermeable membrane from being lowered in rejection ratio by a deformation of this membrane while ensuring the flow rate of a permeation liquid flowing in a permeation-side flow-channel sufficiently. The spiral membrane element comprises a layered body which comprises a composite semipermeable membrane, a supply-side flow-channel member, and a permeation-side flow-channel member; and the permeation-side
(Continued)

flow-channel member comprises a tricot knitted fabric having a plurality of ribs each formed by repeating loops in a linear form in a longitudinal direction, and a plurality of grooves present between the ribs; has a membrane support index of 60 to 135, the membrane support index being calculated in accordance with the specified numerical relationship.

6 Claims, 2 Drawing Sheets

(51) Int. Cl.
 *B01D 69/10* (2006.01)
 *B01D 69/12* (2006.01)
 *C02F 103/08* (2006.01)
(52) U.S. Cl.
 CPC ............ *C02F 1/44* (2013.01); *B01D 2313/04* (2013.01); *B01D 2313/146* (2013.01); *B01D 2325/04* (2013.01); *B01D 2325/40* (2013.01); *C02F 1/441* (2013.01); *C02F 2103/08* (2013.01); *Y02A 20/131* (2018.01)
(58) Field of Classification Search
 CPC .......... B01D 2313/146; B01D 2325/04; B01D 2325/40; C02F 1/44; C02F 1/441; C02F 2103/08; Y02A 20/131
 See application file for complete search history.

(56) References Cited

U.S. PATENT DOCUMENTS

| | | |
|---|---|---|
| 6,277,282 B1 | 8/2001 | Kihara et al. |
| 6,454,942 B1 | 9/2002 | Shintani et al. |
| 2010/0006504 A1 | 1/2010 | Odaka et al. |
| 2012/0261333 A1* | 10/2012 | Moran ................... B01D 63/10 210/500.23 |
| 2015/0060354 A1 | 3/2015 | Hane et al. |

FOREIGN PATENT DOCUMENTS

| | | |
|---|---|---|
| JP | H10-137558 | 5/1998 |
| JP | 2000-051668 | 2/2000 |
| JP | 2000-0511668 | 2/2000 |
| JP | 2000-034941 | 12/2000 |
| JP | 2000-342941 | 12/2000 |
| JP | 2007-167783 | 7/2007 |
| JP | 2010-131483 | 6/2010 |
| JP | 2015-205269 | 11/2015 |
| JP | 2017-000939 | 1/2017 |
| WO | WO 2007/114069 | 10/2007 |
| WO | WO 2013/125583 | 8/2013 |

OTHER PUBLICATIONS

International Search Report, dated Feb. 21, 2017, in corresponding international patent application No. PCT/JP2016/087205.
Extended European Search Report, dated Oct. 18, 2019, in corresponding European Patent Application No. 16881632.0.
Chinese Office Action dated Jul. 27, 2020, in corresponding Chinese Patent Application No. :201680072444.3.

* cited by examiner

SPIRAL MEMBRANE ELEMENT

TECHNICAL FIELD

The present invention relates to a spiral membrane element (hereinafter referred to also as a "membrane element") using a composite semipermeable membrane for separating and concentrating a specified substance or the like from various liquids.

BACKGROUND ART

In recent years, in metropolises at seashore regions in dry and semidry districts where water resources are not easily ensured, trials have been made for desalting seawater to be desalinated. Furthermore, in countries where water resources are poor, such as China and Singapore, trials have been made for purifying industrial wastewater and domestic wastewater to be reused. In recent years, attempts have been further made for removing oils and salts from oil-mixed wastewater high in turbidity, which is discharged from oil land plants or the like, and then reusing the resultant water. It has been understood that from the viewpoint of costs, efficiency and others, it is useful for such a water treatment to use a membrane method using a composite semipermeable membrane.

As illustrated in FIG. 1, such a water treatment method frequently makes use of a spiral membrane element equipped with the following: a layered body including composite semipermeable membranes 2, supply-side flow-channel members 6 and permeation-side flow-channel members 3; a perforated central pipe 5 on which this layered body is wound; and sealing portions 21 for preventing supply-side flow-channels from being mixed with permeation-side flow-channels (see Patent Document 1). When the membrane element 1 is used, a supply liquid 7 is supplied from one of the two end surface sides of the membrane element 1. The supplied supply liquid 7 flows along the supply-side flow-channel members 6 in a direction parallel with an axial core direction A1 of the central pipe 5 to be discharged as a concentrated liquid 9 from the other end surface side of the membrane element 1. As represented by broken-line arrows in the figure, a permeation liquid 8 that has permeated the composite semipermeable membranes 2, in a step in which the supply liquid 7 flows along the supply-side flow-channel members 6, flows along the permeation-side flow-channel members 3 from openings 5a to the inside of the central pipe 5, and then flows from one of the ends of this central pipe 5 to the outside of the membrane element 1.

As described in, for example, Patent Document 2, a permeation-side flow-channel member of a spiral membrane element that has been conventionally used is a product in which a tricot knitted fabric is impregnated with a resin to be heightened in rigidity, considering the insurance of flow-channels in the permeation-side flow-channel, a pressure loss therein, and others. This document states that it is preferred for reducing the pressure loss in the permeation-side flow-channel that the width of grooves made in surfaces of the tricot knitted fabric is from 0.5 to 0.9 mm.

PRIOR ART DOCUMENTS

Patent Documents

Patent Document 1: JP-A-H10-137558
Patent Document 2: JP-A-S62-57609

SUMMARY OF THE INVENTION

Problems to be Solved by the Invention

However, in a case where at the time of forming a spiral membrane element, a composite semipermeable membrane is made thinner than conventional membranes to improve this element in effective membrane area, the following has been made evident about a permeation-side flow-channel member that has been hitherto used for a spiral membrane element for low-pressure: when a machine having this membrane element is repeatedly driven, the composite semipermeable membrane increases in deformation quantity so that the rejection ratio thereof, which is a membrane performance, is lowered.

The following has also been made evident: merely by making grooves in the permeation-side flow-channel member small in width to prevent such a lowering in the rejection ratio, a permeation liquid flowing in a permeation-side flow-channel constituted by the permeation-side flow-channel member becomes small in flow rate.

Thus, an object of the present invention is to provide a spiral membrane element that can make a composite semipermeable membrane high in effective membrane area, and that can restrain the composite semipermeable membrane from being lowered in rejection ratio by a deformation of this membrane while ensuring the flow rate of a permeation liquid flowing in a permeation-side flow-channel sufficiently.

Means for Solving the Problems

The inventors have made eager investigations about a relationship between the flow rate of permeation liquid and the rejection ratio of the semipermeable membrane, and the shape and structure of a permeation-side flow-channel member to find out that the above-mentioned problems can be solved by using, for a permeation-side flow-channel member, a tricot knitted fabric having a specified shape and structure even when a composite semipermeable membrane is made thinner than in the prior art. Thus, the present invention has been accomplished.

Accordingly, the spiral membrane element of the present invention is a spiral membrane element comprising: a layered body which comprises a composite semipermeable membrane having a porous support and a separating functional layer on/over a surface of the porous support, a supply-side flow-channel member, and a permeation-side flow-channel member; a perforated central pipe around which the layered body is wound; and a sealing portion that prevents a supply-side flow-channel from being mixed with a permeation-side flow-channel; the porous support of the composite semipermeable membrane having a thickness of 70 to 120 μm; the permeation-side flow-channel member comprising a tricot knitted fabric having a plurality of ribs each formed by repeating loops in a linear form in a longitudinal direction, and a plurality of grooves present between the ribs; the permeation-side flow-channel member having a membrane support index of 60 to 135, the membrane support index being calculated in accordance with "the number (wale) of grooves per 25-mm"×{rib width (mm)/groove width (mm)}, and the permeation-side flow-channel member having a flow-channel index of 0.018 to 0.045 (mm$^2$), the flow-channel index being calculated in accordance with {groove width (mm)×groove depth (mm)× "the number (wale) of grooves per 25-mm"}/"the number (course) of loops forming ribs per 25-mm".

In the spiral membrane element of the present invention, the membrane support index, on which the ratio between the number of the ribs that support the membrane and the rib width is reflected, is 60 or more. Thus, even when the composite semipermeable membrane is made thinner than that in the prior art, the composite semipermeable membrane can be restrained from being lowered in rejection ratio by a repeated deformation of this membrane. Moreover, the membrane support index is 135 or less. This matter allows to ensure the flow rate of a permeation liquid flowing in the permeation-side flow-channels sufficiently. Furthermore, the flow-channel index, on which the total sectional area of the flow-channels and the resistance of the loops are reflected, is 0.018 (mm$^2$) or more; thus, the flow rate of the permeation liquid can be sufficiently ensured. The flow-channel index is 0.045 (mm$^2$) or less; thus, the composite semipermeable membrane can also be restrained from being repeatedly deformed. Additionally, the thickness of the porous support of the composite semipermeable membrane is from 70 to 120 μm. This matter allows to make the composite semipermeable membrane higher in effective membrane area than in the prior art.

It is preferred in the present invention that the thickness of the supply-side flow-channel member is from 0.10 to 0.40 mm. When the permeation-side flow-channel member has a thickness in this range, permeation-side flow-channels can be sufficiently ensured, and further the composite semipermeable membrane in the spiral membrane element can sufficiently ensure an effective membrane area.

It is also preferred that the permeation-side flow-channel member has a groove width of 0.10 to 0.30 mm. When the permeation-side flow-channel member has such a groove width, a tricot knitted fabric can easily be gained in which the membrane support index and the flow-channel index are in the above-mentioned respective ranges. By a synergetic effect of the membrane support index and the flow-channel index, the composite semipermeable membrane becomes able to be restrained from being lowered in rejection ratio by a deformation of the membrane while the flow rate of the permeation liquid is sufficiently ensured with a higher certainty.

It is also preferred that the porous support is a porous support comprising a nonwoven fabric layer having a thickness of 50 to 90 μm, and a polymer porous layer positioned on/over a single surface of the nonwoven fabric layer and having a thickness of 10 to 35 μm. By forming these layers to have such a thickness relationship, an appropriate bend rigidity can be given to the composite semipermeable membrane under the condition that the total thickness thereof is within a predetermined range while problems based on defects of the porous support are not easily caused.

It is also preferred that the flow-channel member is a tricot knit fabric subjected to resin reinforcing or melt-bonding treatment after the knit is formed. When the rigidity of the tricot knitted fabric can be made high in this way, flow-channels based on the permeation-side flow-channel member can be sufficiently ensured.

It is preferred that the permeation-side flow-channel member is wound to render a direction of the grooves continuous in the linear form a direction along a circumferential direction of the membrane element. By locating the permeation-side flow-channel member in this way, the pressure loss of the permeation liquid can be made smaller when the permeation liquid flows in the central pipe.

BRIEF DESCRIPTION OF THE DRAWINGS

FIG. 2(a) is a bottom view thereof, and FIG. 2(b) is a front view that schematically illustrates a relationship between loops and oblique threads.

FIG. 3(a) illustrates an example of a Denbigh knitted fabric (close loop), and FIG. 3(b) illustrates an example of a Denbigh knitted fabric (open loop).

MODE FOR CARRYING OUT THE INVENTION (Spiral Membrane Element)

Figure 1:
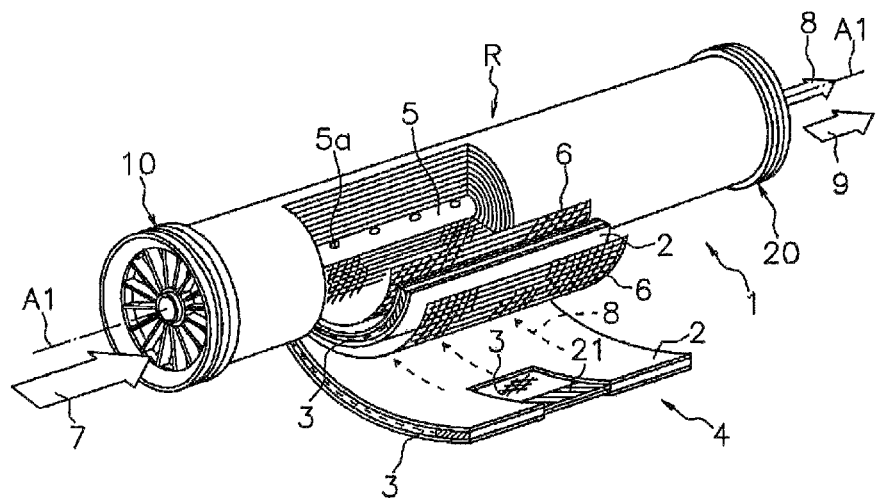
FIG. 1 is a perspective view illustrating an example of the spiral membrane element of the present invention, this element being partially cut.

As illustrated in FIG. 1, a spiral membrane element of the present invention is equipped with the following: a layered body including composite semipermeable membranes 2, supply-side flow-channel members 6 and permeation-side flow-channel members 3; a perforated central pipe 5 on which this layered body is wound; and sealing portions 21 for preventing supply-side flow-channels from being mixed with permeation-side flow-channels. In the present embodiment, an example of a wound body R is illustrated in which plural separating membrane units including the composite semipermeable membranes 2, the supply-side flow-channel members 6, and the permeation-side flow-channel members 3 are wound on the central pipe 5.

The sealing portions 21 for preventing the supply-side flow-channels from being mixed with the permeation-side flow-channels are as follows: when envelope-form membranes 4 (baglike membranes) are each formed, for example, by putting two of the composite semipermeable membranes 2, respectively, onto both surfaces of one of the permeation-side flow-channel members 3, and then bonding these members to each other at their three sides, one of the sealing portions 21 is formed at an outer peripheral-side end side of the envelope-form membrane, and two of the sealing portions 21 are formed at an upstream-side end side thereof, and at a downstream-side end side thereof. It is preferred that one of the sealing portions 21 is further located between the central pipe 5, and inner peripheral ends of the upstream-side end side and the downstream-side end side.

About the envelope-form membranes 4, their opening is fitted to the central pipe 5. The envelope-form membranes are spirally wound, together with the netlike supply-side flow-channel members 6, onto the outer peripheral surface of the central pipe 5. In this way, the wound body R is formed. On an upstream side of this wound body R, for example, an upstream-side end member 10, such as a seal carrier, is located; and on a downstream side thereof, a downstream-side end member 20, such as a telescoping preventing member, is optionally located.

In such a spiral membrane element, usually, the envelope-form membranes 4 are wound in a number of about 20 to 30. In the present invention, however, the envelope-form membranes 4 can be wound in a number of about 30 to 40 since the thickness of the composite semipermeable membranes is smaller than in the prior art. This matter allows to heighten the composite semipermeable membranes in effective area to attain a treatment of a larger volume of liquid. Thus, it is understood that the efficiency of the treatment is remarkably enhanced.

When this membrane element, which is a membrane element 1, is used, a supply liquid 7 is supplied from one of the two end surface sides of the membrane element 1. The supplied supply liquid 7 flows along the supply-side flow-channel members 6 in a direction parallel with an axial core direction A1 of the central pipe 5 to be discharged as a concentrated liquid 9 from the other end surface side of the membrane element 1. As represented by broken-line arrows in the figure, a permeation liquid 8 that has permeated the composite semipermeable membranes 2, in a step in which the supply liquid 7 flows along the supply-side flow-channel members 6, flows along the permeation-side flow-channel members 3 from openings 5a to the inside of the central pipe 5, and then flows out from one of the ends of this central pipe 5.

The supply-side flow-channel members 6 generally have a function of ensuring gaps through which a fluid is supplied thoroughly to the membrane surfaces. The supply-side flow-channel members 6 may each be, for example, a net, a knitted fabric, or an irregularity-worked sheet. A flow-channel member having a maximum thickness of about 0.1 to 3 mm is appropriately usable as the need arises. About the supply-side flow-channel members 6, it is preferred that the pressure loss thereof is lower. Furthermore, these flow-channel members are more preferably flow-channel members that cause an appropriate turbulence effect. On both surfaces of any one of the separating membranes, two flow-channel members are set, respectively. In general, different flow-channel members are used as one of the supply-side flow-channel members 6 on the supply side, and one of the permeation-side flow-channel members 3 on the permeation side. For the supply-side flow-channel members 6, netlike flow-channel members are used which have a large mesh and a large thickness while for the permeation-side flow-channel members 3, flow-channel members are used which have a small mesh and are made of a woven cloth or a knitted fabric.

When an RO membrane or NF membrane is used for desalination of seawater, wastewater treatment or other use purposes, the supply-side flow-channel members 6 are each located on the inner surface side of one of the composite semipermeable membranes 2 that is folded in half. For the structure of the supply-side flow-channel members 6, it is generally preferred to use a netlike structure in which linear products are arranged in a lattice form.

The material that forms the supply-side flow-channel members is not particularly limited, and may be, for example, polyethylene or polypropylene. The resin may contain a fungicide or antibacterial agent. The thickness of each of the supply-side flow-channel members 6 is generally from 0.2 to 2.0 mm, preferably from 0.5 to 1.0 mm. If the thickness is too large, the quantity of the membranes that can be held in the element is unfavorably decreased as well as the permeation amount of the element. Conversely, if the thickness is too small, pollutants easily adhere thereto, so that the element is easily deteriorated in permeation performance.

In particular, by combining these flow-channel members with the supply-side flow-channel members 6 thickness of each of which is 0.9 to 1.3 mm in the present invention, pollutants are less easily deposited thereon, and further bio-fouling is less easily generated. Thus, when the membrane element is continuously used, a treated liquid can be restrained from being lowered in flux.

The central pipe 5 is sufficient to be a pipe having, in the periphery thereof, openings 5a. Any central pipe in the prior art is usable. When the membrane element is used for desalination, wastewater treatment, and others, the permeation liquid 8 that has passed through the composite semipermeable membranes 2 generally flows through the openings 5a in the central pipe 5 to the inside thereof. The length of the central pipe 5 is generally larger than the axial direction length of the element. However, the central pipe 5 may be, for example, a central pipe having a coupled structure, for example, in which the pipe is separable into plural parts. The material that forms the central pipe 5 is not particularly limited, and may be a thermosetting resin or thermoplastic resin.

About the spiral membrane element of the present invention, in the wound body R after the sealing with the resin, both ends thereof may be subjected to, for example, trimming to adjust the length of the body R in an axial core direction A1 thereof. Furthermore, it is allowable therein to dispose, for example, a perforated end member, a sealing member, a reinforcing member and an exterior to prevent the wound body R from undergoing deformations (such as telescoping).

The spiral membrane element of the present invention is a spiral membrane element as described above in which the thickness of composite semipermeable membranes each having a separating functional layer on a surface of a porous support is from 70 to 120 μm, and permeation-side flow-channel members as described above are made of a tricot knitted fabric having a membrane support index and a flow-channel index in respective predetermined ranges. Hereinafter, the composite semipermeable membranes, and the permeation-side flow-channel members will be described in detail.

(Permeation-Side Flow-Channel Members)

When an RO membrane or NF membrane is used for seawater desalination, wastewater treatment or the like, the permeation-side flow-channel members are each located on a permeation side of one of the composite semipermeable membranes (a porous support side of this membrane that is opposite to the separating functional layer side thereof). This permeation-side flow-channel member is required to support the membrane from the back side of the membrane against pressure applied to the membrane, and further ensure flow-channels for a permeation liquid.

Figure 2:
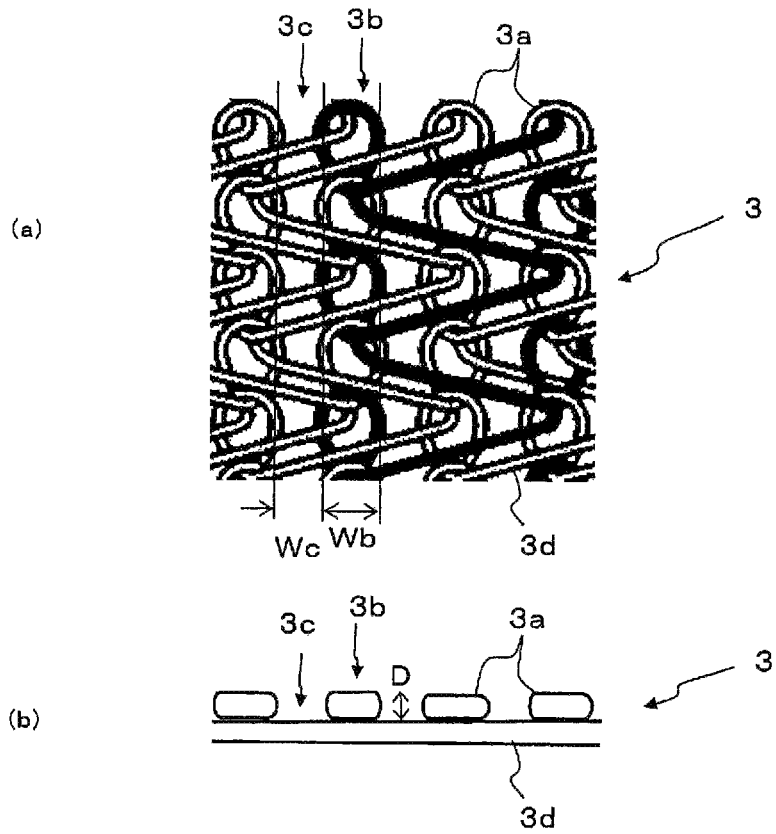
FIG. 2 are views illustrating an example of a permeation-side flow-channel member in the spiral membrane element of the present invention.

In the present invention, the permeation-side flow-channel members 3 are each made of a tricot knitted fabric to ensure such a function. Examples of the tricot knitted fabric include a single Denbigh knitted fabric, a double Denbigh knitted fabric, a single atlas knitted fabric, a single cord knitted fabric, and a double cord knitted fabric (referred to also as a cord knitted fabric merely). In the present invention, a tricot knitted fabric as illustrated in each of FIGS. 2(a) to 2(b) is preferred, which is classified to a cord knitted fabric or Denbigh knitted fabric. In FIG. 2(a), in order to make the knitted shape of a single warp thread easily understandable, the warp thread is represented in black. In FIG. 2(b), a relationship between loops 3a and oblique threads 3d is schematically illustrated. In the present invention, the tricot knitted fabric is in particular preferably a tricot knitted fabric subjected to resin reinforcing or melt-bonding treatment after the knitted fabric is formed.

As in the cord knitted fabric illustrated in, for example, FIGS. 2(a) to 2(b), the above-mentioned tricot knitted fabrics each have plural ribs 3b each made of loops 3a repeated in a linear form in a longitudinal direction, and plural grooves 3c present between these ribs 3b. The grooves 3c each have, in the bottom thereof, one of the oblique threads 3d for linking one of the loops 3a with the next loop 3a to extend a warp thread. In other words, the single warp thread is constituted by moieties of the loops 3a and moieties of the oblique thread 3d.

Figure 3:
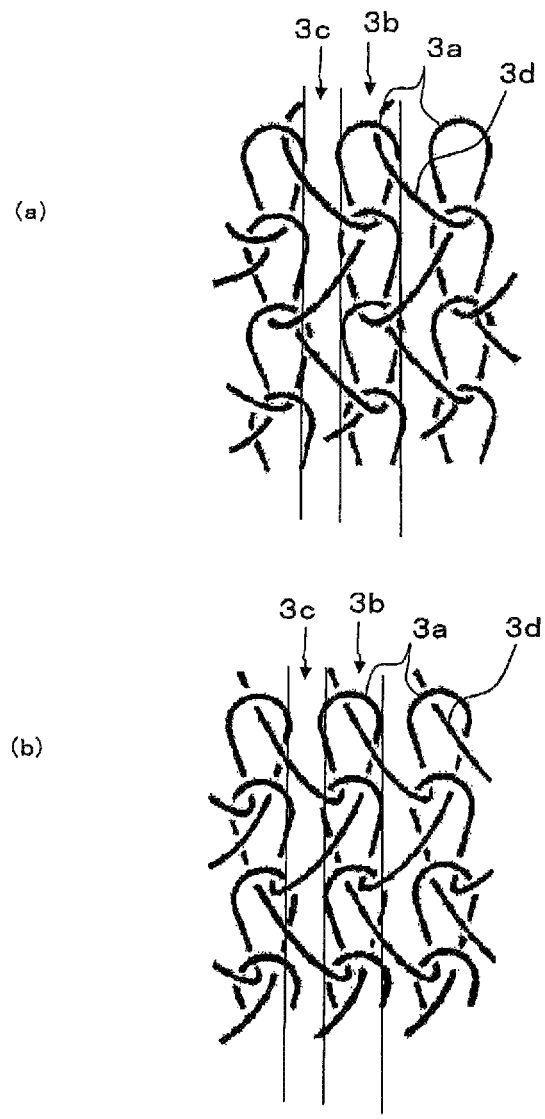
FIG. 3 are each a bottom view illustrating a different example of the permeation-side flow-channel member in the spiral membrane element of the present invention.

In FIGS. 3(a) to 3(b), other examples of any one of the permeation-side flow-channel members are illustrated. FIG.

3(a) illustrates an example of a Denbigh knitted fabric (close loop); and FIG. 3(b), an example of a Denbigh knitted fabric (open loop). Each of these examples also has plural ribs 3b each made of loops 3a repeated in a linear form in a longitudinal direction, and plural grooves 3c present between these ribs 3b. The grooves 3c each have, in the bottom thereof, one of the oblique threads 3d for linking one of the loops 3a with the next loop 3a to extend a warp thread. In other words, the single warp thread is constituted by moieties of the loops 3a and moieties of the oblique thread 3d.

In the permeation-side flow-channel members 3 in the present invention, the membrane support index is from 60 to 135, preferably from 64 to 133, more preferably from 70 to 120. The membrane support index is calculated out in accordance with "the number (wale) of grooves per 25-mm"×{rib width Wb (mm)/groove width Wc (mm)}.

The groove width Wc in a tricot knitted fabric denotes the average value of the largest interval portion between adjacent ones of the loops 3a and the smallest interval portion between the same. In working examples, a measurement is made about the average value of the largest interval portion between adjacent two of the loops 3a and the smallest interval portion between the same from an optical microscopic photograph thereof. The same is measured about 10 loop pairs. The average value of the resultant values is then gained. When the tricot knit is reinforced with a resin, individual dimensions thereof are defined as dimensions gained from a shape of the loops 3a which is constituted by adding the thickness of the resin present on each of the loops 3a to the loop original shape (the same is applied to individual dimensions that will be described hereinafter).

The rib width Wb denotes the average value of the largest interval portion of any one of the loops 3a and the smallest interval portion thereof. In the working examples, a measurement is made about the average value of the largest interval portion of one of the loops 3a and the smallest interval portion thereof from an optical microscopic photograph thereof. The same is measured about 10 loop pairs. The average value of the resultant values is then gained.

In the permeation-side flow-channel members 3 in the present invention, the flow-channel index is from 0.018 to 0.045 (mm$^2$), preferably from 0.020 to 0.040 (mm$^2$), more preferably from 0.022 to 0.035 (mm$^2$). The flow-channel index is calculated out in accordance with {groove width Wc (mm)×groove depth D (mm)×"the number (wale) of grooves per 25-mm"}/"the number (course) of loops 3a forming ribs 3b per 25-mm".

The groove depth D in the tricot knitted fabric denotes the height from the front surface of the oblique thread 3d present between adjacent two of the loops 3a to the highest portion of the loops 3a. In the working examples, a measurement is made about the height from the front surface of the oblique thread 3d present between the loops 3a to the highest portion of the loops 3a from an optical microscopic photograph thereof. The same is measured about 10 loop pairs. The average value of the resultant values is then gained.

In the present invention, the groove width Wc in the tricot knitted fabric is preferably from 0.05 to 0.40 mm, more preferably from 0.10 to 0.28 mm. The wale per 25-mm is preferably from 40 to 60, and the rib width Wb is preferably from 0.2 to 0.4 mm.

In the tricot knitted fabric, the groove depth D is preferably from 0.10 to 0.15 mm, and the number of the loops 3a forming the rib 3b per 25-mm is preferably from 40 to 55.

The thickness of the permeation-side flow-channel members is preferably from 0.10 to 0.40 mm, more preferably from 0.15 to 0.35 mm, even more preferably from 0.20 to 0.30 mm. If the thickness is less than 0.10 mm, sufficient flow-channels are not easily ensured to cause a problem that the pressure loss of the permeation liquid is increased. If the thickness is more than 0.40 mm, the composite semipermeable membranes in the membrane element become small in effective area to cause a problem that the flow rate of the permeation liquid is lowered. In order to form a tricot knitted fabric having the above-mentioned thickness, the constituent threads of the permeation-side flow-channel members each preferably have a diameter of 0.1 to 0.15 mm.

These dimensions, and the membrane support index and the flow-channel index are adjustable in accordance with, for example, the knitting manner when the tricot knitted fabric is produced, the setting of the wale and the course, the thread diameter, and tension applied at the time of the knitting.

For the constituent threads of the permeation-side flow-channel members, the following examples are given: polyesters such as polyethylene terephthalate, and polyethylene naphthalate; and polyolefins such as polyethylene and polypropylene. Out of these resins, polyethylene terephthalate is particularly preferred from the viewpoint of workability and productivity.

When a knitted fabric is formed and subsequently reinforced with a resin, a method therefor is, for example, a method of impregnating the inside of its fiber with the resin to cure the resin, or a method of coating the surface of its fiber with the resin to cure the resin. Examples of the resin used for the reinforcement include melamine resin, and epoxy resin.

The constituent threads of the permeation-side flow-channel members may each be a monofilament or a multi-filament. However, constituent threads each having a constant thickness form the tricot knitted fabric. Out of such tricot knitted fabrics, preferred is a cord knitted fabric having an evident structure in which grooves are continuous in a linear form.

In the membrane element, the direction in which the permeation-side flow-channel members are arranged may be any direction. Preferably, the flow-channel members are wound to render the direction of their continuous grooves a direction along the circumferential direction of the membrane element.

(Composite Semipermeable Membranes)

The composite semipermeable membranes in the present invention are each a membrane having a separating functional membrane on a surface of a porous support. The porous support is preferably a support having a polymer porous layer on a single surface of a nonwoven fabric layer. The thickness of the porous support is preferably from 70 to 120 μm, more preferably from 80 to 100 μm. The thickness of the composite semipermeable membranes is preferably from 70 to 125 μm, more preferably from 80 to 105 μm.

Such a composite semipermeable membrane is called a RO (reverse osmotic) membrane, an NF (nano-filtration) membrane or an FO (forward osmotic) membrane depending on the filtration properties or treatment methods, and is usable for the production of super pure water, seawater desalination, desalinization of sprinkling water, reuse of wastewater, or others.

The separating functional layer is, for example, a polyamide-based, cellulose-based, polyether-based or silicon-based separating functional layer. The separating functional layer is preferably a product having a polyamide-based separating functional layer. The polyamide-based separating functional layer is generally a homogenous membrane having no perceptible pores and having a desired ion separating power. This separating functional layer is not particularly limited as far as the layer is a polyamide-based thin membrane that is not easily peeled off from the above-mentioned polymer porous layer. For example, the following is well known: a polyamide-based separating functional layer in which a polyfunctional amine component and a polyfunctional acid halide component are subjected to interfacial polymerization on a porous support membrane.

It is known that such a polyamide-based separating functional layer has a pleat-form microstructure. The thickness of this layer is not particularly limited, and is from about 0.05 to 2 µm, preferably from 0.1 to 1 µm. It is known that if this layer is too thin, defects in the membrane plane comes to be easily generated, and if the layer is too thick, the separating functional layer is deteriorated in permeation performance.

The method for forming the polyamide-based separating functional layer onto the surface of the polymer porous layer is not particularly limited, and may be any known method. Examples thereof include interfacial polymerization, phase separation, and thin-membrane applying methods. In the present invention, the interfacial polymerization method is preferably used. The interfacial polymerization method is a method of coating the upper of the polymer porous layer with, for example, an aqueous amine solution which contains a polyfunctional amine component, and then bringing an organic solution which contains a polyfunctional acid halide component into contact with the surface coated with this aqueous amine solution to generate interfacial polymerization so as to form a skin layer. After the application of the aqueous amine solution and that of the organic solution, this method is preferably advanced while an excess portion thereof is removed. In this case, the removing method is preferably, for example, a method of inclining the target membrane to cause the excess portion to flow, a method of spraying gas thereto to blow the excess portion off, or a method of bringing a blade made of, for example, rubber into contact therewith to scrape off the excess portion.

In this step, a period until the aqueous amine solution and the organic solution contact each other depends to the composition and the viscosity of the aqueous amine solution, and the diameter of pores in the surface of the porous support membrane, and is from about 1 to 120 seconds, preferably from about 2 to 40 seconds. If this interval period is too long, the aqueous amine solution penetrates and diffuses into the depth of the inside of the porous support membrane, so that unreacted fractions of the polyfunctional amine component remain in a large volume in the porous support membrane. Thus, inconveniences may be caused. When the interval between the applications of these solutions is too short, an excess of the aqueous amine solution remains too much so that the membrane tends to be lowered in performance.

After the contact between this aqueous amine solution and the organic solution, it is preferred to heat and dry the workpiece at a temperature of 70° C. or higher to form a skin layer. In this way, the membrane can be heightened in mechanical strength, heat resistance and others. The heating temperature is more preferably from 70 to 200° C., in particular preferably from 80 to 130° C. The heating period is preferably from about 30 seconds to 10 minutes, more preferably from about 40 seconds to 7 minutes.

The polyfunctional amine component contained in the aqueous amine solution is a polyfunctional amine having two or more reactive amine groups. Examples thereof include aromatic, aliphatic and alicyclic polyfunctional amines. Examples of the aromatic polyfunctional amines include m-phenylenediamine, p-phenylenediamine, o-phenylenediamine, 1,3,5-triaminobenzene, 1,2,4-triaminobenzene, 3,5 diaminobenzoic acid, 2,4-diaminotoluene, 2,6-diaminotoluene, N,N'-dimethyl-m-phenylenediamine, 2,4-diaminoanisole, amidol, xylylenediamine. Examples of the aliphatic polyfunctional amines include ethylenediamine, propylenediamine, tris(2-aminoethyl)amine, and n-phenylethylenediamine. Examples of the alicyclic polyfunctional amines include 1,3-diaminocyclohexane, 1,2-diaminocyclohexane, 1,4-diaminocyclohexane, piperazine, 2,5-dimethylpiperazine, and 4-aminomethylpiperazine. These polyfunctional amines may be used singly or in any combination of two or more thereof. In particular, when a high rejection ratio is required, out of reverse osmotic membrane performances, in the present invention, it is preferred to use, as a main component, m-phenylenediamine, which gives a separating functional layer high in denseness. When a high flux keeping ratio is required out of NF membrane performances, it is preferred to use, as a main component, piperazine.

The polyfunctional acid halide component contained in the organic solution is a polyfunctional acid halide having two or more reactive carbonyl groups. Examples thereof include aromatic, aliphatic, and alicyclic polyfunctional acid halides. Examples of the aromatic polyfunctional acid halides include trimesic acid trichloride, terephthalic acid dichloride, isophthalic acid dichloride, biphenyl dicarboxylic acid dichloride, naphthalene dicarboxylic acid dichloride, benzenetrisulfonic acid trichloride, benzenedisulfonic acid dichloride, and chlorosulfonylbenzene dicarboxylic acid dichloride.

Examples of the aliphatic polyfunctional acid halides include propanedicarboxylic acid dichloride, butanedicarboxylic acid dichloride, pentanedicarboxylic acid dichloride, propanetricarboxylic acid trichloride, butanetricarboxylic acid trichloride, pentanetricarboxylic acid trichloride, glutaryl halides, and adipoyl halides. Examples of the alicyclic polyfunctional acid halides include cyclopropanetricarboxylic acid trichloride, cyclobutanetetracarboxylic acid tetrachloride, cyclopentanetricarboxylic acid trichloride, cyclopentanetetracarboxylic acid tetrachloride, cyclohexanetricarboxylic acid trichloride, tetrahydrofurantetracarboxylic acid tetrachloride, cyclopentanedicarboxylic acid dichloride, cyclobutanedicarboxylic acid dichloride, cyclohexanedicarboxylic acid dichloride, and tetrahydrofurandicarboxylic acid dichloride. These polyfunctional acid halides may be used singly or in any combination of two or more thereof. In order to yield a skin layer high in rejection performance, it is preferred to use an aromatic polyfunctional acid halide. It is also preferred to use, as at least one component of the polyfunctional acid halide components, a polyfunctional acid halide having tri or higher polyfunctionalities to form a crosslinked structure.

In the above-mentioned interfacial polymerization method, the concentration of the polyfunctional amine component in the aqueous amine solution is not particularly limited, and is preferably from 0.1 to 7% by weight, more preferably from 1 to 5% by weight. If the concentration of the polyfunctional amine component is too low, defects are easily generated in the skin layer so that the composite semipermeable membrane tends to be lowered in salt blocking performance. In the meantime, if the concentration of the polyfunctional amine component is too high, the skin layer becomes too thick so that the permeation flux of the liquid tends to be lowered.

The concentration of the polyfunctional acid halide component in the organic solvent is not particularly limited, and is preferably from 0.01 to 5% by weight, more preferably from 0.05 to 3% by weight. If the concentration of the polyfunctional acid halide component is too low, unreacted fractions of the polyfunctional amine component increase so that defects are easily generated in the skin layer. In the meantime, if the concentration of the polyfunctional acid halide component is too high, unreacted fractions of the polyfunctional acid halide component increase. Consequently, the skin layer becomes too thick so that the permeation flux of the liquid tends to be lowered.

The organic solvent into which the polyfunctional acid halide is incorporated is not particularly limited as far as the solvent is a solvent which is low in solubility in water and dissolves the polyfunctional acid halide component without deteriorating the porous support membrane. Example thereof include cyclohexane, heptane, octane, nonane, and other saturated hydrocarbons; and 1,1,2-trichlorotrifluoroethane and other halogen-substituted hydrocarbons. The organic solvent is preferably a saturated hydrocarbon having a boiling point of 300° C. or lower, preferably 200° C. or lower.

An additive may be added to the aqueous amine solution or the organic solution to improve the resultant skin layer in various performances and handleability. Examples of the additive include polyvinyl alcohol, polyvinyl pyrrolidone, polyacrylic acid, and other polymers; sorbitol, glycerin, and other polyhydric alcohols; sodium dodecylbenzene sulfonate, sodium dodecylsulfate, sodium laurylsulfate, and other surfactants; sodium hydroxide, trisodium phosphate, triethylamine, and other basic compounds for removing halogenated hydrogen produced by polymerization; acylation catalysts; and compounds each described in JP-A-H08-224452, the solubility parameter of which is from 8 to 14 $(cal/cm^3)^{1/2}$.

A coating layer made of a polymer that may be of various types may be laid on a naked surface of the separating functional layer. The polymer component is not particularly limited as far as the polymer is a polymer that dissolves neither the separating functional layer nor the porous support membrane, and does not elute out when the membrane element makes a water treatment operation. Examples thereof include polyvinyl alcohol, polyvinyl pyrrolidone, hydroxypropyl cellulose, polyethylene glycol, and saponified polyethylene-vinyl acetate copolymers. It is preferred to use, out of these examples, polyvinyl alcohol. It is particularly preferred to use a polyvinyl alcohol having a saponification degree of 99% or more, or to crosslink a polyvinyl alcohol having a saponification degree of 90% or more together with the polyamide-based resin of the skin layer to form a structure which does not elute out easily at the water treatment time. By laying such a coating layer, the state of electric charges on the membrane surface is adjusted and further hydrophilicity is given to the surface. This matter allows to restrain pollutants from adhering on the surface. Furthermore, synergetic effects of this matter and the present invention heighten the flux keeping effect further.

The nonwoven fabric layer used in the present invention is not particularly limited as far as the layer is a nonwoven fabric layer that keeps the separating performance and permeation performance of the composite semipermeable membranes while giving an appropriate mechanical strength thereto. Any commercially available nonwoven fabric is usable. The material of this nonwoven fabric may be a material made of, for example, polyolefin, polyester or cellulose. The material may be a mixture in which plural materials are mixed with each other. The use of polyester is particularly preferred from the viewpoint of the moldability thereof. It is allowable to use a long-fiber nonwoven fabric or a short-fiber nonwoven fabric. The use of the long-fiber nonwoven fabric is preferred from the viewpoint of fine fluffing, which causes pinhole defects, and the evenness of the membrane plane. At this time, the gas permeability of the nonwoven fabric layer alone may be from about 0.5 to 10 $cm^3/cm^2 \cdot s$, more preferably from about 1 to 5 $cm^3/cm^2 \cdot s$, although the gas permeability is not limited into such a range.

The thickness of the nonwoven fabric layer is preferably 90 µm or less, more preferably 80 µm or less, in particular preferably 70 µm or less. If this thickness is too large, the composite semipermeable membrane becomes too high in permeation resistance so that the flux of the liquid is easily lowered. Reversely, if the thickness is too small, the nonwoven fabric layer is lowered in mechanical strength as a composite semipermeable membrane support, so that a stable composite semipermeable membrane is not easily gained. Thus, the thickness is preferably 50 µm or more, more preferably 55 µm or more.

The above-mentioned polymer porous layer is not particularly limited as far as this layer is a polymer porous layer that can form the above-mentioned polyamide-based separating function layer. The polymer porous layer is usually a finely porous layer having a pore diameter of about 0.01 to 0.4 µm. A material for forming the finely porous layer may be a material that may be of various types, examples thereof including polysulfones, polyarylethersulfones such as polyethersulfone, polyimides, and polyfluorovinylidenes. It is preferred to form a polymeric porous layer using a polysulfone or polyarylethersulfone since the layer is chemically, mechanically and thermally stable.

In the present invention, the thickness of the polymer porous layer is set preferably to 35 µm or less, more preferably to 32 µm or less. It has been understood that if this layer is too thick, the composite semipermeable membrane is easily lowered in flux keeping ratio after the membrane element is pressurized. Furthermore, the thickness is in particular preferably 29 µm or less, most preferably 26 µm or less. By forming the layer thinly to this degree, the stability of the flux keeping ratio can be made higher. If this layer is too thin, defects are easily generated therein. Thus, the thickness is preferably 10 µm or more, more preferably 15 µm or more.

An example of a method will be demonstrated in which when the polymer of the polymer porous layer is polysulfone, the layer is produced. The polymer porous layer can be produced by a method generally called a wet method and a dry and wet method. The polymer porous layer can be formed on a nonwoven fabric through a solution preparing step of dissolving a polysulfone and various additives initially into a solvent, a coating step of coating the upper of the nonwoven fabric with the solution, a drying step of vaporizing the solvent in this solution to generate micro phase separation, and a fixing step of immersing the resultant into a solidifying bath such as a water bath to fix the dry matter. The thickness of the polymer porous layer can be set by adjusting the concentration in the solution, and the coating quantity under a calculation of the proportion of the polymer with which the nonwoven fabric is impregnated.

(Usage of Spiral Membrane Element)

The spiral membrane element of the present invention is usable for seawater desalination, wastewater treatment and others. In recent years, in order to decrease the power consumption of the machine concerned when the machine is driven, composite semipermeable membranes have been developed which can gain a sufficient permeation flux even at a pressure lower than in the prior art. In an article using such a composite semipermeable membrane, the differential pressure (driving pressure) between the supply side pressure and the permeation side pressure of the membrane is set into a range, for example, from 0.3 to 3.0 MPa, preferably from 0.5 to 1.5 MPa. Also when the article is driven at such a low pressure, permeation-side flow-channel members higher in density than in the prior art are used in the spiral membrane element of the present invention. In this way, the spiral membrane element is made capable of coping with the flow-channel member that its porous support is made thinner.

EXAMPLES

Hereinafter, the present invention will be described in detail by way of working examples thereof, and comparative examples. However, the invention is not limited to these working examples. In the individual working examples, and others, physical properties and others are evaluated as described below.

(Thickness Measurement)

The thickness of a product was measured, using a commercially available thickness gauge (DIAL THICKNESS GAUGE G-7C, manufactured by Ozaki Mfg. Co., Ltd.). About measurements of the thickness of a nonwoven fabric layer and that of a polymer porous layer, the thickness of the nonwoven fabric layer was beforehand measured. In the state that the polymer porous layer was formed on the nonwoven fabric layer, the thickness of the whole of the composite semipermeable membrane support was measured. Thereafter, the difference in thickness between the composite semipermeable membrane support, and the nonwoven fabric was gained, and the difference was used as the thickness of the polymer porous layer. In the measurement of the thickness of each membrane plane, the average value of arbitrarily-selected ten points in the same membrane plane was used.

(Measurements of Course, Wale, Groove Width, Rib Width, and Groove Depth of Permeation-Side Flow-Cannel Member)

In an optical microscopic photograph of a flat surface and a cross section of a permeation-side flow-channel member, the groove width, the rid width, and the groove depth thereof were each measured at each of arbitrarily-selected ten points therein, using a scale as a reference. The average value of the measured values was used. About the wale and the course of the permeation-side flow-channel member, measurements were made through an optical microscope about the number (wale) of grooves in an area 25 mm×25 mm of the flow-channel member, and the number (course) of loops forming the ribs per 25 mm.

(Endurance)

A produced flat-membrane-form composite semipermeable membrane is cut into a piece having a predetermined shape and a predetermined size. The composite semipermeable membrane is set, together with a permeation-side flow-channel member that may be of various types, into a flat-membrane-evaluating cell. A 1500 mg/L NaCl solution in water is used as a supply liquid. An on-off cycle that "the pressure therein is increased to 4 MPa and then the pressure is returned to 0 MPa" is repeated 200 times.

Apart from this operation, before and after the 200-time repeating, an aqueous solution containing NaCl in a concentration of 1500 mg/L is brought into contact with the membrane while a pressure of 1.05 MPa is given to the supply side of the membrane at 25° C. After 30 minutes elapse, from the electric conductivity of the resultant permeation liquid, the NaCl concentration in the permeation liquid is measured. In accordance with an expression described below, the ratio is calculated between the original salt permeation coefficient of the membrane (before the pressurization) and the salt permeation coefficient after the 200-time pressurizing cycles. In this way, the endurance of the membrane was evaluated. The permeation-side flow-channel member was arranged to bring the surface thereof in which the linearly continuous grooves are made into contact with the porous support of the composite semipermeable membrane.

Salt permeation coefficient(SP)(%)=("NaCl concentration in membrane permeation liquid"/"NaCl concentration in supply liquid")×100

(Water Permeability)

Two produced flat-membrane-form composite semipermeable membranes are each cut into a piece having a predetermined shape and a predetermined size. A permeation-side flow-channel member that may be of various types is sandwiched between the two. The resultant is set into a flat-membrane-evaluating cell. While a pressure of 1 MPa was applied to the composite semipermeable membrane from the upper of the membrane, water was caused to flow from an end surface of the permeation-side flow-channel member into the cell at a pressure of 1.0 MPa, and the permeation amount (H-value) of the water was measured over 60 seconds. The permeation-side flow-channel member was arranged to be brought into contact with the porous support of the composite semipermeable membrane to make the linearly continuous grooves parallel with the water-flowing direction.

Production Example 1 (Production of Each Composite Semipermeable Membrane)

While a nonwoven fabric (width: about 1 m) made of a polyester for water-treatment-membrane support and having a thickness of 65 µm was transported, a mixed solution of polysulfone and dimethylformamide (polymer concentration: 18.35% by weight) was continuously applied onto a surface of the fabric. The resultant was subjected to solidifying treatment in water of 35° C. temperature to produce a long porous support (thickness: 90 µm) in which a polymer porous layer of 25 µm thickness was formed.

While this porous support was transported, a solution A was brought into contact with the polymer porous layer outer-surface, this solution being a solution in which 3% by weight of m-phenylenediamine was mixed with 0.15% by weight of sodium laurylsulfate. An excess of the solution A was then removed to form a coating layer of the solution A. Next, a solution B was brought into contact with the solution A coating layer outer-surface, the solution B being a solution in which 0.3% by weight of trimesic acid chloride was incorporated in a solvent of hexane. Thereafter, the resultant was dried in an environment of 120° C. temperature to form a separating functional layer. In this way, each long composite semipermeable membrane was produced.

Production Example 2 (Production of Composite Semipermeable Membrane)

A long composite semipermeable membrane was produced under the same conditions as in Production Example 1 except that a nonwoven fabric of 90 μm thickness was used in Production Example 1 to form a polymer porous layer of 40 μm thickness to yield a porous support of 130 μm thickness.

Examples 1 to 3

Each of the examples made use of one of the composite semipermeable membranes yielded in Production Example 1 and one of permeation-side flow-channel members E to G shown in Table 1 to evaluate the endurance and the water permeability of the sample. The results are shown in Table 1.

Comparative Examples 1 to 4

Each of the examples made use of one of the composite semipermeable membranes yielded in Production Example 1 and one of permeation-side flow-channel members A to D shown in Table 1 to evaluate the endurance and the water permeability of the sample. The results are shown in Table 1.

TABLE 1

| | Indicators Target values | | Course (Loops/ 25-mm) | Wale (Number/ 25-mm) | Rib width (μm) | Groove width (μm) | Groove depth (μm) | Membrane support index "Wale × rib width"/"groove width" (—) | Flow-channel resistance index "Wale × groove width × groove depth"/"course" (mm2) |
|---|---|---|---|---|---|---|---|---|---|
| | All tricot knitted fabrics | | | | | | | | |
| Comparative example 1 | | A | 60 | 61 | 311 | 136 | 131 | 139 | 0.018 |
| Comparative example 2 | | B | 43 | 35 | 364 | 490 | 117 | 26 | 0.047 |
| Comparative example 3 | | C | 68 | 47 | 296 | 255 | 111 | 55 | 0.02 |
| Comparative example 4 | | D | 67 | 54 | 289 | 189 | 112 | 83 | 0.017 |
| Comparative example 5 | | E | 51 | 56 | 344 | 145 | 128 | 133 | 0.02 |
| Example 1 | Groove width similar to that in Comparative Example 1 | E | 51 | 56 | 344 | 145 | 128 | 133 | 0.02 |
| Example 2 | Groove width similar to that in Comparative Example 3 | F | 40 | 51 | 293 | 232 | 131 | 64 | 0.039 |
| Example 3 | Groove width similar to that in Comparative Example 4 | G | 49 | 55 | 340 | 174 | 122 | 107 | 0.024 |

| | Indicators Target values | | Membrane thickness (mm) | Endurance ≤4.5 Ratio between values before and after cycle-repeating 200 times | Judgment | Water permeability ≥24 H-value (ml/60 sec) | Judgment |
|---|---|---|---|---|---|---|---|
| | All tricot knitted fabrics | | | | | | |
| Comparative example 1 | | A | 90 | 1.8 | ○ (good) | 18.5 | x (bad) |
| Comparative example 2 | | B | 90 | 11.1 | x | 28 | ○ |
| Comparative example 3 | | C | 90 | 7 | x | 25.5 | ○ |
| Comparative example 4 | | D | 90 | 2.9 | ○ | 22.5 | x |
| Comparative example 5 | | E | 130 | 2.1 | ○ | — | — |
| Example 1 | Groove width similar to that in Comparative Example 1 | E | 90 | 3.9 | ○ | 24 | ○ |
| Example 2 | Groove width similar to that in Comparative Example 3 | F | 90 | 2.9 | ○ | 41 | ○ |

TABLE 1-continued

| | | | | | | | |
|---|---|---|---|---|---|---|---|
| Example 3 | Groove width similar to that in Comparative Example 4 | G | 90 | 2.9 | ○ | 29.5 | ○ |

As shown in Table 1, about each of Examples 1 to 3 each making use of the permeation-side flow-channel member having a membrane support index and a flow-channel index in respective predetermined ranges, the endurance was 4.5 (-) or less, and the water permeability was 24 (mL/60-seconds). By contrast, it has been understood that about each of Comparative Examples 1 to 4 each making use of the permeation-side flow-channel member about which at least one of the membrane support index and the flow-channel index was outside the predetermined range(s), the endurance or the water permeability was deteriorated.

Comparative Example 5

In Example 1, instead of the composite semipermeable membrane yielded in Production Example 1, the composite semipermeable membrane yielded in Production Example 2 (porous support thickness: 130 μm) was used. Under exactly the same conditions as in Example 1 except the use, the endurance was evaluated. As a result, the endurance was 2.1. The thickness of the membrane was larger than that in Example 1, and the pressure resistance thereof was made better correspondingly. However, when the spiral membrane element was filled with the composite semipermeable membrane, the effective membrane area was reduced by 16% as compared with that in Example 1. Thus, undesirably, the flow rate of the membrane element is lowered.

DESCRIPTION OF REFERENCE SIGNS

2: Composite semipermeable membrane
3: Permeation-side flow-channel member
3a: Loop
3b: Rib
3c: Groove
4: Envelope-form membrane
5: Central pipe
6: Supply-side flow-channel member
7: Supply liquid
8: Permeation liquid
9: Concentrated liquid
21: Sealing portion
Wb: Rib width
Wc: Groove width
D: Groove depth

The invention claimed is:

1. A spiral membrane element, comprising: a layered body which comprises a composite semipermeable membrane having a porous support and a separating functional layer on/over a surface of the porous support, a supply-side flow-channel member, and a permeation-side flow-channel member; a perforated central pipe around which the layered body is wound; and a sealing portion that prevents a supply-side flow-channel from being mixed with a permeation-side flow-channel;

the porous support of the composite semipermeable membrane having a thickness of 70 to 120 μm;
the permeation-side flow-channel member comprising a tricot knitted fabric having a plurality of ribs each formed by repeating loops in a linear form in a longitudinal direction, and a plurality of grooves present between the ribs;
the permeation-side flow-channel member having a membrane support index of 60 to 135, the membrane support index being calculated in accordance with "the number (wale) of grooves per 25-mm"×{rib width (mm)/groove width (mm)}, and
the permeation-side flow-channel member having a flow-channel index of 0.020 to 0.045 (mm$^2$), the flow-channel index being calculated in accordance with {groove width (mm)×groove depth (mm)×"the number (wale) of grooves per 25-mm"}/"the number (course) of loops forming ribs per 25-mm",
wherein the composite semipermeable membrane is directly adjacent to a surface having the plurality of grooves of the permeation-side flow-channel member.

2. The spiral membrane element according to claim 1, wherein the permeation-side flow-channel member has a thickness of 0.10 to 0.40 mm.

3. The spiral membrane element according to claim 1, wherein the permeation-side flow-channel member has a groove width of 0.10 to 0.30 mm.

4. The spiral membrane element according to claim 1, wherein the porous support is a porous support comprising a nonwoven fabric layer having a thickness of 50 to 90 μm, and a polymer porous layer positioned on/over a single surface of the nonwoven fabric layer and having a thickness of 10 to 35 μm.

5. The spiral membrane element according to claim 1, wherein the permeation-side flow-channel member is a tricot knitted fabric subjected to resin reinforcement or melt-bonding treatment after the knitted fabric is formed.

6. The spiral membrane element according to claim 1, wherein the permeation-side flow-channel member is wound to render a direction of the grooves continuous in the linear form a direction along a circumferential direction of the membrane element.

* * * * *